United States Patent
Tashiro et al.

(10) Patent No.: US 10,099,436 B2
(45) Date of Patent: Oct. 16, 2018

(54) PROCESS AND APPARATUS FOR PRODUCING FIBER-REINFORCED THERMOPLASTIC RESIN TAPE

(71) Applicant: Kobe Steel, Ltd., Hyogo (JP)

(72) Inventors: Naoyuki Tashiro, Takasago (JP); Takayasu Fujiura, Kobe (JP); Kazuya Takamura, Kobe (JP); Seiji Zenke, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 15/503,857

(22) PCT Filed: Aug. 17, 2015

(86) PCT No.: PCT/JP2015/073059
§ 371 (c)(1),
(2) Date: Feb. 14, 2017

(87) PCT Pub. No.: WO2016/039081
PCT Pub. Date: Mar. 17, 2016

(65) Prior Publication Data
US 2017/0252988 A1    Sep. 7, 2017

(30) Foreign Application Priority Data

Sep. 11, 2014   (JP) ................. 2014-184834

(51) Int. Cl.
*B32B 41/00*   (2006.01)
*B29C 70/52*   (2006.01)
(Continued)

(52) U.S. Cl.
CPC ............ *B29C 70/521* (2013.01); *B29B 11/06* (2013.01); *B29B 11/16* (2013.01); *B29B 15/122* (2013.01);
(Continued)

(58) Field of Classification Search
CPC ....... B29C 70/521; B29C 11/16; B29C 11/06; B29K 2307/04; B29K 2023/12
(Continued)

(56) References Cited

U.S. PATENT DOCUMENTS

| 3,378,884 A | 4/1968 | Meteer et al. |
| 4,988,278 A | 1/1991 | Mills |

(Continued)

FOREIGN PATENT DOCUMENTS

| GB | 1332521 A | 10/1973 |
| JP | H06-210751 A | 8/1994 |

(Continued)

OTHER PUBLICATIONS

International Search Report issued in PCT/JP2015/073059; dated Oct. 27, 2015.
(Continued)

*Primary Examiner* — Michael N Orlando
*Assistant Examiner* — Joshel Rivera
(74) *Attorney, Agent, or Firm* — Studebaker & Brackett PC

(57) ABSTRACT

Provided are a process and an apparatus for producing a fiber-reinforced thermoplastic resin tape, the process and the apparatus being capable of preventing fiber cut from occurring at the start of production of the fiber-reinforced thermoplastic resin tape. The provided process includes a resin impregnation step of opening a fiber bundle and impregnating the fiber bundle with molten thermoplastic resin and a through-nozzle passing step of passing the fiber bundle having undergone the resin impregnation step through a slit formed in a nozzle. The through-nozzle passing step includes setting, at the start of production, a gap dimension of the slit to a dimension larger than a normal dimension and changing the gap dimension of the slit to the normal dimen-
(Continued)

sion when a predetermined condition is satisfied, after the production start.

7 Claims, 9 Drawing Sheets

(51) Int. Cl.
    *B29B 11/06*     (2006.01)
    *B29B 11/16*     (2006.01)
    *B29B 15/12*     (2006.01)
    *B29K 23/00*     (2006.01)
    *B29K 307/04*     (2006.01)

(52) U.S. Cl.
    CPC .......... *B29C 70/52* (2013.01); *B29K 2023/12* (2013.01); *B29K 2307/04* (2013.01)

(58) Field of Classification Search
    USPC ........................... 156/64, 350, 351, 378, 379
    See application file for complete search history.

(56) References Cited

U.S. PATENT DOCUMENTS

2006/0087059 A1* 4/2006 Boissonnat ......... B29C 47/0021
    264/555
2013/0113133 A1 5/2013 Kashikar
2013/0193623 A1 8/2013 Kashikar

FOREIGN PATENT DOCUMENTS

| | | |
|---|---|---|
| JP | 2007-076224 A | 3/2007 |
| JP | 2007-118216 A | 5/2007 |
| JP | 2007-254566 A | 10/2007 |
| WO | 2011131664 A1 | 10/2011 |

OTHER PUBLICATIONS

Notification of Transmittal of Translation of the International Preliminary Report on Patentability (Chapter I) and Translation of Written Opinion of the International Searching Authority; PCT/JP2015/073059; dated Mar. 23, 2017.

Extended European Search Report dated Mar. 21, 2018, from corresponding EP Appl No. 15839613.5, 7 pp.

* cited by examiner

PROCESS AND APPARATUS FOR PRODUCING FIBER-REINFORCED THERMOPLASTIC RESIN TAPE

TECHNICAL FIELD

The present invention relates to a process and an apparatus for producing a tape made of fiber-reinforced thermoplastic resin formed by impregnating fibers with thermoplastic resin.

BACKGROUND ART

As a technique concerning production of a carbon fiber-reinforced thermoplastic resin tape, there has been known, for example, a technique described in Patent Literature 1. This method uses a nozzle. The nozzle includes a nozzle upper member and a nozzle lower member, the two members defining therebetween a slit with a given gap equal to or smaller than 130 μm. The nozzle further includes urging means for urging the nozzle upper member and the nozzle lower member in the direction of reducing the interval. The method includes a step of passing a carbon fiber strand impregnated with thermoplastic resin through the slit of the nozzle to thereby draw out a thermoplastic-resin-impregnated tape having a tape thickness equal to or smaller than 130 μm from the nozzle.

Paragraph 0026 of the specification of Patent Literature 1 mentions: that accumulation of feather in a downstream-side slit nozzle can raise the surface pressure of a molten resin contact surface; the rise of the surface pressure involves decrease in the pressing force of a pressure cylinder corresponding to the urging means to allow ascent of the nozzle upper member and/or descent of the nozzle lower member, thereby allowing the feather to be drawn out from the downstream-side slit nozzle together with the tape to eliminate the accumulation of the feather; and the suppression of the accumulation of the feather makes it possible to hinder the fibers from being cut.

However, the technique described in Patent Literature 1, that is, the technique for urging the nozzle upper member and the nozzle lower member defining the slit in the directions of reducing the interval therebetween is presented for preventing fibers from being cut during production of the resin-reinforced thermoplastic resin tape, taking no account of circumstances at the start of production. The inventors have found a tendency of fiber cut particularly at the start of production of the fiber-reinforced thermoplastic resin tape. Continuing operation while leaving such fiber cut generates possibility that the fiber having cut clogs the nozzle to cause all of the fibers constituting the tape to be cut. This problem occurs in high frequency particularly in the case of producing a fiber-reinforced thermoplastic resin tape having high content of fibers and small tape thickness.

CITATION LIST

Patent Literature

Patent Literature 1: Japanese Unexamined Patent Publication No. 2007-118216

SUMMARY OF INVENTION

An object of the present invention is to provide a process and an apparatus for producing a fiber-reinforced thermoplastic resin tape, the process and the apparatus being capable of suppressing occurrence of fiber cut at the start of production of the fiber-reinforced thermoplastic resin tape.

Provided is a process for producing a fiber-reinforced thermoplastic resin tape, the process including: a resin impregnation step of opening a fiber bundle and impregnating the opened fiber bundle with molten thermoplastic resin; and a through-nozzle passing step of passing the fiber bundle having undergone the resin impregnation step through a slit formed in a nozzle to form the resin bundle into a tape shape. The through-nozzle passing step includes passing the fiber bundle, at the start of production, through the slit in a state where the slit has a gap dimension larger than a normal dimension corresponding to a target thickness dimension of the fiber-reinforced thermoplastic resin tape and changing the gap dimension of the slit, at a point in time when a predetermined condition is satisfied after the start of production, into the normal dimension and then passing the fiber bundle through the slit.

Also provided is an apparatus for producing a fiber-reinforced thermoplastic resin tape, the apparatus including: a resin impregnation device that opens a fiber bundle and impregnates the opened fiber bundle with molten thermoplastic resin; and a nozzle provided in an outlet section of a container of the resin impregnation device and defining a slit allowing the fiber bundle impregnated with the thermoplastic resin to pass through the slit, the nozzle bringing the fiber bundle passing through the slit into a tape shape. The nozzle includes a dimension selection mechanism allowing a gap dimension of the slit defined by the nozzle to be selected between a normal dimension equivalent to a target thickness dimension of the fiber-reinforced thermoplastic resin tape and a production-start dimension larger than the normal dimension.

DESCRIPTION OF EMBODIMENTS

There is explained below an embodiment for carrying out the present invention, with reference to the drawings. Specifically, explained is the configuration of a production apparatus for a fiber-reinforced thermoplastic resin tape, while a production process for the fiber-reinforced thermoplastic resin tape is explained.

(As to a Production Apparatus for a Fiber-Reinforced Thermoplastic Resin Tape)

Figure 1:
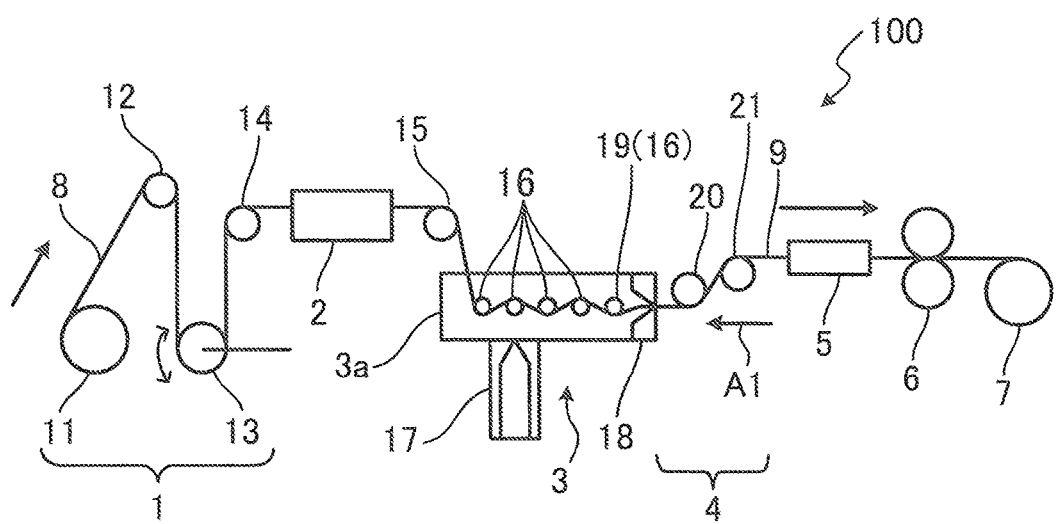
FIG. 1 is a schematic view of a production apparatus for a fiber-reinforced thermoplastic resin tape according to an embodiment of the present invention.

FIG. 1 shows a production apparatus 100 for a fiber-reinforced thermoplastic resin tape according to the embodiment. The production apparatus 100 performs production of a fiber-reinforced thermoplastic resin tape with conveyance of a fiber bundle 8, including a supply machine 1, a preheating machine 2, a resin impregnation device 3, a nozzle 18, a roller cooling section 4, a cooling section 5, a pulling machine 6, and a winding-up machine 7 arranged in this order from the upstream side of the conveyance direction of the fiber bundle 8.

<Feeding Machine>

Figure 2:
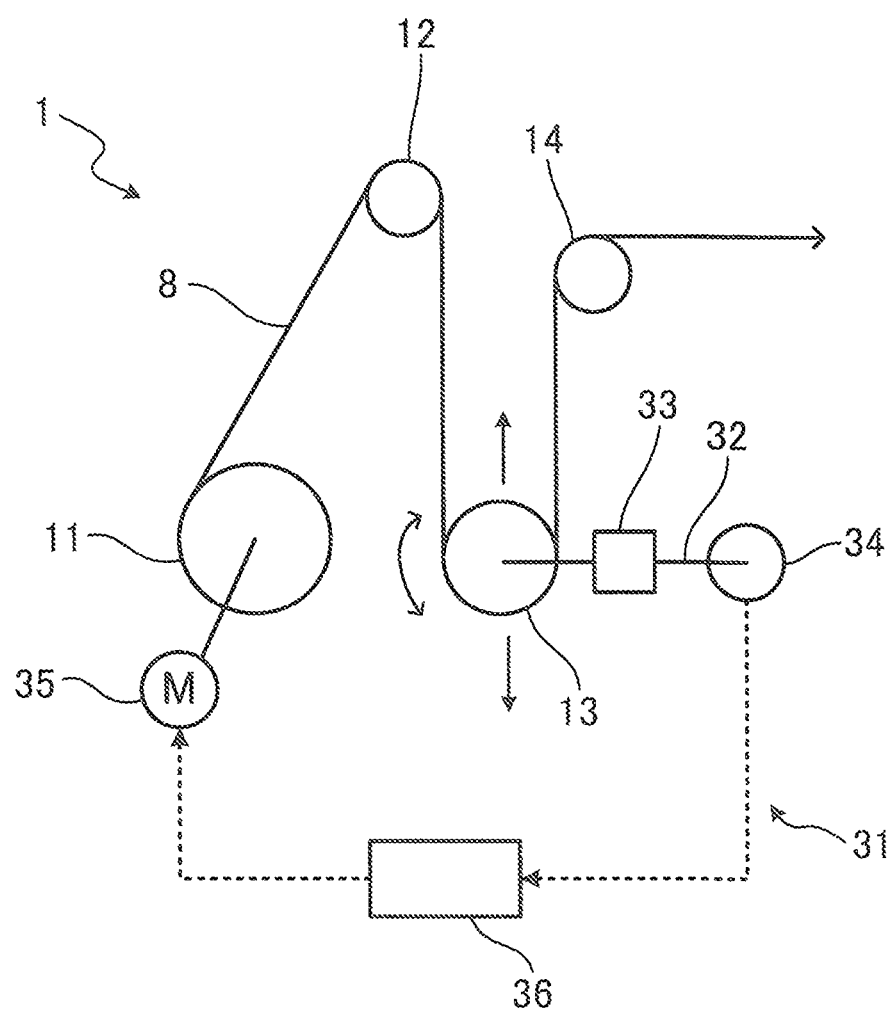
FIG. 2 is an enlarged view of a supply machine included in the production apparatus.

The supply machine 1 includes a bobbin 11, a guide bar 12, a dancer roller 13, a guide roller 14, and a tension adjusting mechanism 31 shown in FIG. 2.

On the bobbin 11 is wound a fiber bundle 8 formed of, for example, approximately 12,000, bundled fibers. Each of the fibers constituting the fiber bundle 8 according to this embodiment is a carbon fiber, but the present invention is not limited to this. As the fiber constituting a fiber bundle according to the present invention, there can be used, for example, a glass fiber, an aramid fiber, a ceramics fiber, a metal fiber, and a continuous fiber such as fiber obtained from heterocyclic ring containing polymer formed of polybenzochiazole, polybenzoxazole, or the like. Also natural vegetable fiber produced by spinning discontinuous fibers into a thread can be used. As the carbon fiber can be used, for example, polyacrylonitrile (PAN) based, petroleum/coal pitch based, rayon based, or lignin based carbon fibers.

The guide bar 12, while having a circular cross section, is disposed so as to be prevented from rotating around the center axis of the guide bar 12. In contrast, the dancer roller 13 and the guide roller 14, having circular cross sections, are disposed to be allowed to rotate around respective center axes thereof. Furthermore, the dancer roller 13 is disposed movably up and down so as to allow the rotation center axis of the dancer roller 13 to move vertically.

The fiber bundle 8 is supplied from the bobbin 11 and conveyed while coming into contact with each of the guide bar 12, the dancer roller 13, and the guide roller 14, while constant tension is applied to the fiber bundle 8. The tension is adjusted by the dancer roller 13 and the tension adjusting mechanism 31. The force for conveyance (traveling) of the fiber bundle 8 is applied by the pulling machine 6 pulling the fiber bundle 8. The fiber bundle 8 is, thus, pulled up to the pulling machine 6 with the constant tension applied to the fiber bundle 8.

The tension adjusting mechanism 31 operates to keep the tension acting on the fiber bundle 8 constant. The tension adjusting mechanism 31 includes, as shown in FIG. 2, a bar member 32 connected to the center shaft of the dancer roller 13, a tension applying weight 33 provided on the bar member 32, an angle detector 34 attached to the bar member 32, a motor 35 that rotates the bobbin 11, and a controller 36.

The bar member 32 includes a distal end portion connected to the dancer roller 13 and a proximal end portion opposite to the distal end portion, being disposed so as to be able to make rotational movement around the proximal end portion to allow the dancer roller 13 to move up and down. The tension applying weight 33 applies a downward urging force having constant magnitude to the dancer roller 13 through the gravity acting on the tension applying weight 33. The angle detector 34 detects an angle of the rotational movement of the bar member 32 around the proximal end portion.

The controller 36 is electrically connected to the motor 35 and the angle detector 34. The controller 36 adjusts rotational speed of the motor 35 to keep the angle detected by the angle detector 34 within a predetermined range. The tension of the fiber bundle 8 supplied from the bobbin 11 is thereby kept constant. The control of the tension assists the resin impregnation device 3 in stably opening the fiber bundle 8 in explained below. The desirable tension applied to the fiber bundle 8 is, for example, 300 g. The desirable traveling speed of the fiber bundle 8 is, for example, 3 m/minute.

Means for keeping constant the tension of the fiber bundle 8 fed out from the bobbin 11 is not limited to the above tension adjusting mechanism 31. For example, the tension of the fiber bundle 8 can also be kept constant by a device including means for calculating a diameter of the fiber bundle 8 wound on the bobbin 11 through the use of the traveling speed of the fiber bundle 8 and the number of revolutions of the bobbin 11 and means including a powder brake or the like to adjust the brake torque of the bobbin 11.

<Fiber Preheating Machine>

The fiber bundle 8 supplied from the supply machine 1 is fed to the preheating machine 2. The preheating machine 2 heats the fiber bundle 8 to, for example, approximately 100° C. (a preheating step). This causes convergence agent adhering to the fiber bundle 8 to be softened, facilitating opening of the fiber bundle 8 and impregnation of the fiber bundle 8 with thermoplastic resin in the next step. As the preheating machine 2, a known one can be used. The convergence agent is used for bringing a plurality of fibers into convergence to make them easy to handle.

<Resin Impregnation Device and Nozzle>

The fiber bundle 8 having left the preheating machine 2 is fed to the resin impregnation device 3 via the guide roller 15. The resin impregnation device 3 opens the fiber bundle 8 and impregnates the fiber bundle 8 with molten thermoplastic resin. In the resin impregnation device 3, the fiber bundle 8 is opened and the fiber bundle 8 is impregnated with the molten thermoplastic resin (a resin impregnation step).

The resin impregnation device 3 includes a container 3a, an extruding machine 17, and a plurality of impregnation rollers 16. The container 3a has a cylindrical shape long in the conveyance direction of the fiber bundle 8 and stores the molten thermoplastic resin. The temperature of the molten thermoplastic resin is, for example, 230° C. The extruding machine 17 is connected to the container 3a and supplies the molten thermoplastic resin into the container 3a.

The thermoplastic resin used in this embodiment is polypropylene, but it is not limited thereto. As the thermoplastic resin, there can be used, for example, acrylonitrile-butadienstyrene copolymer (ABS), polyamide (nylon 6, nylon 66, etc.), polyacetal, polycarbonate, high density polyethylene, low density polyethylene, straight-chain low density polyethylene, polyethylene terephthalate, polybutylene terephthalate, polyetherimide, polystyrene, polyethersulfone, polyphenylene sulfide, polyether ketone, and polyether ether ketone.

The plurality of impregnation rollers 16 are disposed at a predetermined interval along the conveyance direction of the fiber bundle 8 in the container 3a. Each of the impregnation rollers 16, which has a circular cross section, is disposed rotatably around the center axis thereof while making into contact with the fiber bundle 8 to thereby convey the fiber bundle 8 downstream. The impregnation rollers 16 can be replaced with a guide bar, which has a circular cross section and is disposed so as to be prevented from rotation around the center axis thereof.

The fiber bundle 8 passes through the container 3a in zigzag while coming into contact with each of the plurality of impregnation rollers 16 in the container 3a that store the molten thermoplastic resin as explained above. In other words, the fiber bundle 8 passes through the container 3a while the contact of the impregnation rollers 16 with the lower surface of the fiber bundle 8 and the contact of the impregnation rollers 16 with the upper surface of the fiber bundle 8 are alternately made. The impregnation rollers 16 open the fiber bundle 8 through the above contacts and, furthermore, the fiber bundle 8 is impregnated with the molten thermoplastic resin.

The opening of the fiber bundle 8 is a processing of arraying the plurality of fibers which constitutes the fiber bundle 8 to spread them in a width direction orthogonal to the longitudinal direction of the fiber bundle 8 (the conveyance direction) to flatten the fiber bundle 8. The progress of the opening, therefore, involves increase in the width of the fiber bundle 8 and decrease in the thickness of the fiber bundle 8.

The number of the impregnation rollers 16 is adjusted according to the condition of the opening of the fiber bundle 8 and of the impregnation of the fiber bundle 8 with the thermoplastic resin. Excessive number of impregnation rollers 16 open the fiber bundle 8 excessively to make the fiber density at each of the widthwise opposite ends of the fiber bundle 8 be high. In addition, excessive number of impregnation rollers 16 cause the tension of the fiber bundle 8 to be excessive great, which makes fiber cut easily occur. Conversely, insufficient number of impregnation rollers 16 fails to open the fiber bundle 8 sufficiently, thus making the fiber density in the widthwise center of the fiber bundle 8 be high and/or making the impregnation of the fiber bundle 8 with the thermoplastic resin be insufficient.

The nozzle 18 is provided in the outlet portion of the container 3a to shape the fiber bundle 8 discharged from the container 3a. The nozzle 18 encloses an opening of a rectangular slit, through which the fiber bundle 8 that has undergone the resin impregnation step passes (a through-nozzle passing step). The fiber bundle 8 having passed through the nozzle 18 is spread into a tape shape having reduced thickness. In summary, the nozzle 18 allows the fiber bundle 8 impregnated with the thermoplastic resin to pass through the nozzle while forming the fiber bundle 8 into the tape shape. In the following explanation, the fiber bundle 8 having passed through the nozzle 18 to be formed into the tape shape may be referred to as a tape 9. The suitable temperature of the nozzle 18 is, for example, 230° C.

Figure 3A:
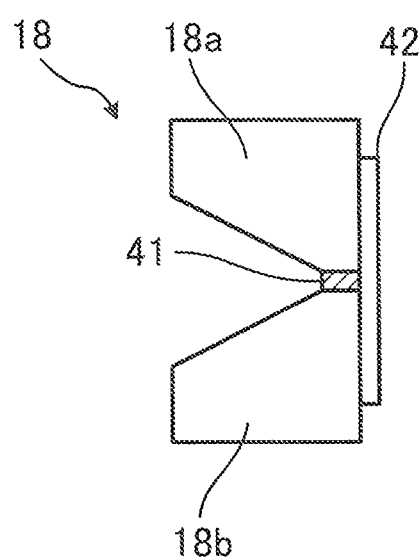
FIG. 3A is an enlarged view of a nozzle included in the production apparatus.
Figure 3B:
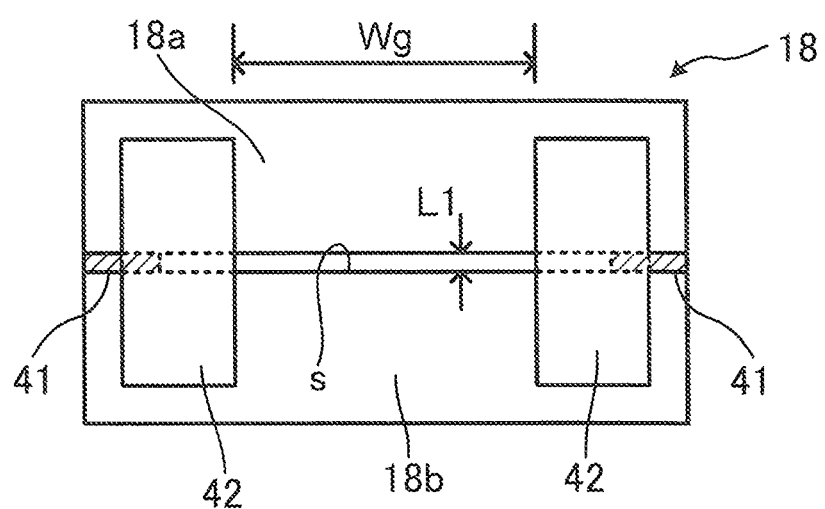
FIG. 3B is a view of the nozzle included in the production apparatus viewed from a direction of an arrow A1 in FIG. 1.

As shown in FIG. 3A and FIG. 3B, the nozzle 18 includes a first nozzle member 18a, a second nozzle member 18b, a pair of right and left shim plates (first shim plates) 41, a pair of right and left guide plates 42, and a pair of right and left shim plates (second shim plates) 43 different from the pair of shim plates 41.

The first nozzle member 18a and the second nozzle member 18b according to this embodiment are arranged vertically so as to be vertically opposed to each other. The pair of shim plates 41 and the pair of shim plates 43 can be selectively sandwiched between the first nozzle member 18a and the second nozzle member 18b in respective positions at the widthwise opposite (in the right-left direction) ends of the nozzle 18, thereby allowing a rectangular slit s to be defined between the first nozzle member 18a and the second nozzle member 18b. The gap dimension of the slit s is, thus, allowed to be selected between a normal dimension L1 corresponding to the first thickness dimension of each of the pair of shim plates 41 and a production-start dimension L0 (>L1) corresponding to the second thickness dimension of each of the pair of shim plates 43. Each of the pair of shim plates 41 and the pair of shim plates 43 is positioned to avoid contact with the fiber bundle 8 passing through the nozzle 18. The interval between the shim plates 41 and the interval between the shim plates 43 are, therefore, larger than the width of a fiber-reinforced thermoplastic resin tape to be produced.

The pair of guide plates 42 is disposed so as to cover the right and left end portions of the opening at the distal end of the nozzle 18 and attached to the first and second nozzle members 18a and 18b with screws or the like. The pair of guide plates 42 is disposed at an interval Wg, which has a dimension equal to the width of the fiber-reinforced thermoplastic resin tape to be produced, that is, which determines the width. The width of the tape 9 having passed through the opening of the nozzle 18 is, thus, adjusted to the width of the fiber-reinforced thermoplastic resin tape to be produced. The interval Wg of the pair of guide plates 42, that is, the width that the fiber-reinforced thermoplastic resin tape to be produced should have, is, for example, 15 mm.

Figure 4:
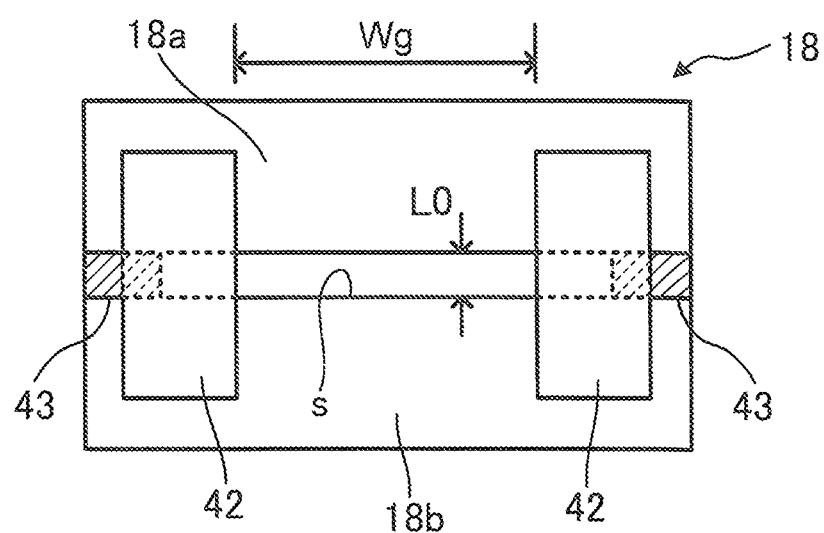
FIG. 4 is a view of a state of the nozzle at the start of production viewed from the direction of the arrow A1.

The gap dimension of the slit s defined in the nozzle 18 to allow the fiber bundle 8 to pass through the slit s is allowed to be changed through replacement of shim plates sandwiched between the first and second nozzle members 18a and 18b. FIG. 4 is a view of the nozzle 18 at the start of production viewed from a direction of an arrow A1 in FIG. 1. FIG. 3B is a view of the nozzle 18 from a stage when a predetermined condition is satisfied after the production start viewed from the direction of the arrow A1. At the start of production of the fiber-reinforced thermoplastic resin tape, used is the pair of shim plates 43 shown in FIG. 4 and having the second thickness dimension larger than the first thickness dimension of the shim plates 41 shown in FIG. 3B, namely, the second shim plates. The second thickness dimension of the shim plates 43 is larger than the thickness dimension of the fiber-reinforced thermoplastic resin tape to be produced, namely, a target thickness dimension. Thus, at the start of production of the fiber-reinforced thermoplastic resin tape, as illustrated in FIG. 4, the gap dimension of the slit s is set to the production-start dimension L0 (>L1) larger than the dimension L1 equivalent to the target thickness. Then, when the predetermined condition is satisfied after the production start, the shim plates 43 are replaced with the shim plates 41, thereby changing the gap dimension of the slit s from the production-start dimension L0 into the normal dimension L1 illustrated in FIG. 3B, i.e., the dimension equivalent to the target thickness dimension. The first and second nozzle members 18a and 18b and the shim plates 41 and 43, thus, constitute a dimension selection mechanism allowing the gap dimension of the slit s to be selected between the normal dimension L1 and the production-start dimension L0 larger than the normal dimension L1.

The "predetermined condition" is, for example, "predetermined time has elapsed after the production start". Accordingly, "when the predetermined condition is satisfied" can be rephrased as, for example, "if the predetermined time has elapsed". The structure for making the gap dimension of the slit s of the nozzle changeable is not limited to one in the embodiment.

At the stage of passing the fiber bundle 8 through the container 3a of the resin impregnation device 3, that is, at the stage before the production start, the fiber bundle 8 has not yet been opened sufficiently. If the fiber bundle 8 was pulled through the thin slit in this state, the fibers and the nozzle 18 would be brought into strong contact with each other in the slit portion to allow fiber cut to easily occur. Continuing the operation while leaving the fiber cut might cause the fiber having cut to clog the nozzle 18 to thereby cause all the fibers (the tape) to be cut. In order to prevent this, the change of the gap dimension of the slit s is performed.

"the start of production" means the time when the pulling machine 6 begins pulling the fiber bundle 8. The normal dimension L1 is a dimension corresponding to the thickness dimension that the (desired) fiber-reinforced thermoplastic resin tape to be produced should have, namely, the target thickness dimension.

The "predetermined condition" may be that, for example, the fiber bundle 8 is opened up enough to have the width of the (desired) fiber-reinforced thermoplastic resin tape to be produced in a position before the fiber bundle 8 reaches the slit s portion of the nozzle 18 (e.g., in the container 3*a* of the resin impregnation device 3). The number of fibers (e.g., 12,000) constituting the fiber bundle 8 to be passed through the slit s is determined on the basis of the width and the thickness of the (desired) fiber-reinforced thermoplastic resin tape to be produced, the type of material of fiber, and the type of thermoplastic resin. This enables the fiber bundle 8 impregnated with the thermoplastic resin when the fiber bundle 8 is opened up to have the width of the (desired) fiber-reinforced thermoplastic resin tape to be produced to have a thickness substantially equal to the thickness of the (desired) fiber-reinforced thermoplastic resin tape to be produced.

The "predetermined condition", alternatively, may be one based on the pulling speed of the tape 9 by the pulling machine 6. The pulling speed, that is, the production speed of the fiber-reinforced thermoplastic resin tape, is set to be a speed lower than normal pulling speed (speed for production), at the start of production (at the start of operation of the apparatus) in order to prevent the tape 9 from being cut. The pulling speed of the tape 9 is increased, after a certain degree of time elapses, to predetermined pulling speed. On the premise that the pulling speed of the tape 9 is thus increased with the elapse of time, the "predetermined condition" may be that the pulling speed of the tape 9 reaches the predetermined pulling speed.

Alternatively, the "predetermined condition" may be that the fiber bundle 8 is opened enough to obtain the width that the (desired) fiber-reinforced thermoplastic resin tape to be produced should have, that is, obtain the target width, and that the pulling speed of the tape 9 have reached the predetermined pulling speed.

Note that "the predetermined time elapses" may be that the time which is optionally set for no particular reason has elapsed.

Figure 5:
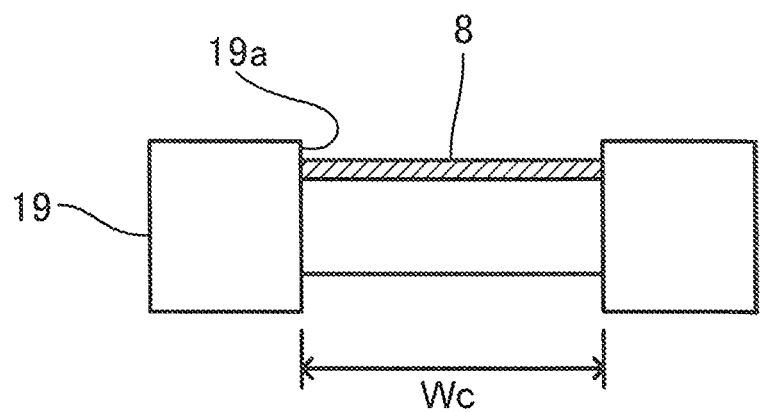
FIG. 5 is a view of a grooved roller included in the production apparatus viewed from the direction of the arrow A1.
Figure 6:
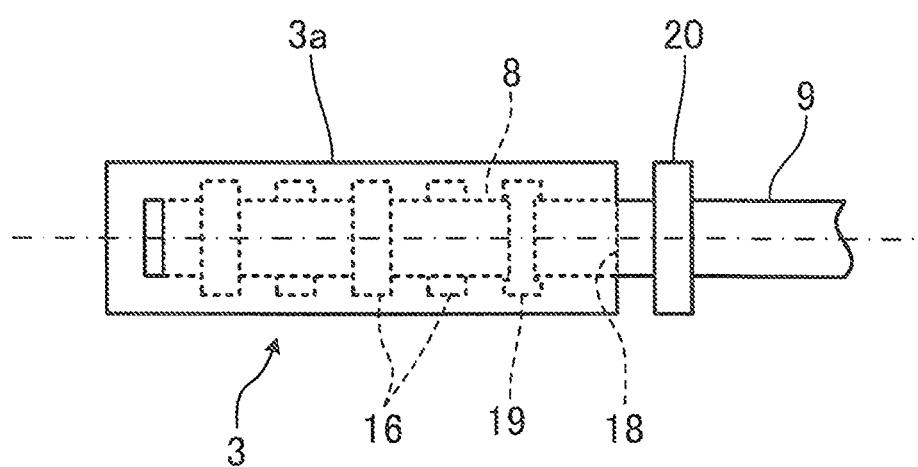
FIG. 6 is a plan view of the production apparatus.

As shown in FIG. 1, FIG. 5, and FIG. 6, the impregnation roller 16 closest to the nozzle 18 among the plurality of impregnation rollers 16 is a grooved roller 19, which is formed with a groove 19*a* shown in FIG. 5. The grooved roller 19 according to this embodiment is single, but it is also possible to provide two or more grooved rollers on the side close to the nozzle 18. Besides, it is also possible to replace the impregnation roller 16 with a guide bar which is also formed with a groove.

As shown in FIG. 5, the groove 19*a* is formed in the axial center part of the grooved roller 19, having width We equivalent to the width of the fiber-reinforced thermoplastic resin tape to be produced, namely, the target width. The grooved roller 19 allows the fiber bundle 8 to pass through the portion having the groove 19*a* to thereby prevent the width of the opened fiber bundle 8 from exceeding the width of the fiber-reinforced thermoplastic resin tape to be produced (i.e., the target width). The width We of the groove 19*a* is equal to the dimension of the interval Wg between the pair of guide plates 42 shown in FIG. 3B.

In this embodiment, in order to facilitate the change of the width of the fiber-reinforced thermoplastic resin tape to be produced, each of the impregnation rollers 16 upstream of the grooved roller 19 is formed of a flat roller having a cylindrical outer circumferential surface with no grooves. Alternatively, every impregnation roller 16 may be a grooved roller.

As shown in FIG. 6, respective widthwise centers of the plurality of impregnation rollers 16 including the grooved roller 19 and the widthwise center of the nozzle 18 are aligned in a single straight line in plan view. This enables the fiber bundle 8 to run along the straight line, thereby suppressing unevenness in the density of the fibers in the fiber-reinforced thermoplastic resin tape to be produced.

<Cooling Roller Section>

As shown in FIG. 1, the tape 9 having passed through the nozzle 18 is fed to the roller cooling section 4. The roller cooling section 4 includes a cooling roller 20 and a cooling roller 21 disposed in this order from the upstream side to the downstream side in the conveyance direction of the tape 9. The cooling rollers 20 and 21 are kept at a constant temperature (e.g., approximately 20° C.) through cooling water supplied from a rotary joint (not shown in the figure). The cooling rollers 20 and 21 cool the tape 9 while feeding the tape 9 to the downstream side (a cooling step).

The temperature of the tape 9 having passed through the nozzle 18 is equal to or higher than the melting point of the thermoplastic resin. Hence, the thermoplastic resin with which the tape 9 is impregnated is not solidified immediately after having passed through the nozzle 18, which tends to cause widthwise evenness in the density in the running fibers. The cooling roller 20 quickly cools the tape 9 immediately after having passed through the nozzle 18. Specifically, the cooling roller 20 cools the front side surface, namely, the upper surface in the figure, of the tape 9. Subsequently, the cooling roller 21 cools the back side surface (namely, the lower surface in the figure) of the tape 9. Through the cooling, the thermoplastic resin included in the tape 9 is solidified before the widthwise evenness in the density in the fibers of the tape 9 occurs.

<Cooling Section>

The tape 9 cooled by the roller cooling section 4 is fed to the cooling section 5 shown in FIG. 1. The cooling section 5 cools the tape 9 with water. The cooling section 5 is, for example, a water cooling pool. The cooling section 5 may be one configured to cool the tape 9 with air. If the cooling by the roller cooling section 4 is sufficient, it allows the cooling section 5 to be omitted.

<Take-Up Machine and the Winding-Up Machine>

The tape 9 cooled by the cooling section 5 is fed to the pulling machine 6. The pulling machine 6 pulls and takes up the cooled tape 9. The winding-up machine 7 winds up the tape 9 pulled by the pulling machine 6.

(Verification Experiment)

Performed was a verification experiment on the above-mentioned effect, that is, the fiber cut prevention effect achieved by setting the gap dimension of the slit s to be larger than the normal dimension at the start of production of the fiber-reinforced thermoplastic resin tape and changing the gap dimension of the slit s, when the predetermined time had elapsed after the production start, into the normal dimension, through the use of an apparatus equivalent to the production apparatus shown in FIG. 1. Specifically, the verification experiment was carried out with respect to the following example and comparative example.

In each of the example and the comparative example, as each of the fibers constituting the fiber bundle 8 was used a carbon fiber having the number of filaments of 12,000, fineness of 800 g/1,000 m, and density of 1.76. Polypropylene resin was used as the thermoplastic resin. The usual gap dimension (the normal dimension) of the slit s was 0.06 mm.

In the example, the pair of thick shim plates 43 shown in FIG. 4 was used at the start of production to set the gap dimension of the slit s was set to 0.15 mm, which was the production-start dimension. At a point in time when the predetermined time had elapsed after the production start, the conveyance of the fiber bundle 8 was temporarily stopped, while the pair of shim plates 43 was replaced with the pair of shim plates 41 thinner than the pair of shim plates 43 to change the gap dimension of the slit s into 0.06 mm, which was the normal dimension, and then the production was resumed. This example was repeated five times in total, in every time of which no fiber cut had occurred.

In the comparative example, operation was continued from the production start while the gap dimension of the slit s was kept at 0.06 mm. This comparative example was also performed five times in total, in four times of which fiber cut had occurred. This result indicates that making the gap dimension of the slit s be larger than the normal dimension at the start of production makes it possible to markedly reduce frequency of the fiber cut.

(Modification of the Nozzle)

Figure 7A:
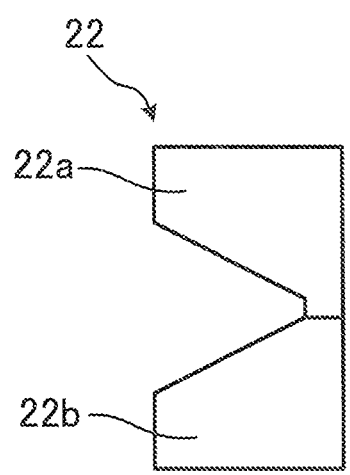
FIG. 7A is a partial sectional side view showing a nozzle according to a modification and is a view equivalent to FIG. 3A.
Figure 7B:
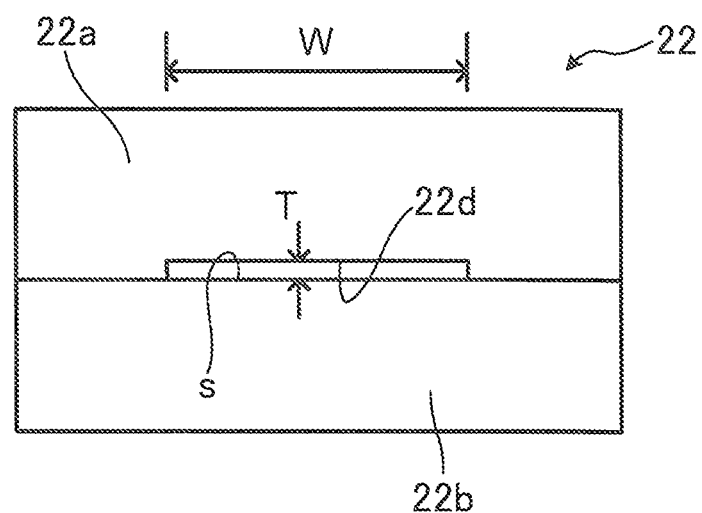
FIG. 7B is a front view showing the nozzle according to the modification, the view corresponding to FIG. 3B.

FIG. 7A and FIG. 7B indicates a nozzle 22 according to a modification. The nozzle 22 includes a first nozzle member 22a and a second nozzle member 22b which are opposed to each other. The first nozzle member 22a is formed with a groove 22d, which forms the slit s having a width dimension W and a gap dimension T equivalent to the normal gap dimension. At the start of production of the fiber-reinforced thermoplastic resin tape, a pair of not-graphically-shown shim plates is sandwiched between the first nozzle member 22a and the second nozzle member 22b in respective positions on widthwise opposite outer sides of the groove 22d to thereby increase the gap dimension of the slit s beyond the normal dimension. At a stage when the predetermined condition is satisfied thereafter, the shim plates are removed to reduce the gap dimension to the normal dimension. The operation of the apparatus is resumed in this state to thereby produce the fiber-reinforced thermoplastic resin tape having thickness corresponding to the normal dimension.

As explained above, provided is a process and an apparatus for producing a fiber-reinforced thermoplastic resin tape, the process and the apparatus being capable of suppressing occurrence of fiber cut at the start of production of the fiber-reinforced thermoplastic resin tape.

Provided is a process for producing a fiber-reinforced thermoplastic resin tape, the process including: a resin impregnation step of opening a fiber bundle and impregnating the opened fiber bundle with molten thermoplastic resin; and a through-nozzle passing step of passing the fiber bundle having undergone the resin impregnation step through a slit formed in a nozzle to form the resin bundle into a tape shape. The through-nozzle passing step includes passing the fiber bundle, at the start of production, through the slit in a state where the slit has a gap dimension larger than a normal dimension corresponding to a target thickness dimension of the fiber-reinforced thermoplastic resin tape and changing the gap dimension of the slit, at a point in time when a predetermined condition is satisfied after the start of production, into the normal dimension and then passing the fiber bundle through the slit.

According to this process, setting the gap dimension of the slit larger than the normal dimension equivalent to the target thickness dimension of the tape allows the fiber and the nozzle to be restrained from strong contact with each other in the slit portion to cut the fiber, at the start of production of the fiber-reinforced thermoplastic resin tape, even if the opening of the fiber bundle is insufficient, thus preventing that the fiber having cut clogs the nozzle to cause all fibers (i.e., the tape) to be cut. At a stage when the predetermined condition is satisfied after the production start, for example, after a predetermined time elapses during which the opening of the fiber bundle progresses, fiber cut is not likely to occur in spite that the gap dimension of the slit is changed to the normal dimension at the point.

The "predetermined condition" is desirably that, for example, the fiber bundle is opened enough to allow the width of the fiber bundle to reach a target width which is a width of a fiber-reinforced thermoplastic resin tape to be produced.

At the stage when the condition is satisfied, where the fiber bundle is sufficiently opened, the fiber and the nozzle can be prevented from strong contact with each other in the slit portion to cause the fiber to be cut, in spite that the gap of the slit is changed to the normal dimension at the point in time when the condition is satisfied.

Alternatively, in the case where the through-nozzle passing step includes increasing production speed which is speed at which the fiber bundle passes through the slit, with the elapse of time from the production start, the predetermined condition may be that the production speed of the fiber-reinforced thermoplastic resin tape has reached predetermined speed. For example, it is also permissible to change the gap dimension of the slit into a predetermined dimension when pulling speed of the tape reaches predetermined pulling speed.

According to this process, the production speed is increased from low speed, which restrains the fiber and the nozzle from strong contact with each other in the slit portion at the start of production. In other words, setting the production speed to lower speed than the predetermined (normal) production speed and setting the gap dimension of the slit larger than the predetermined dimension at the start of production and changing the gap dimension of the slit, at a point in time when the production speed increases to the predetermined speed, to the normal dimension makes it possible to more surely suppress fiber cut at the start of production.

Also provided is an apparatus for producing a fiber-reinforced thermoplastic resin tape, the apparatus including: a resin impregnation device that opens a fiber bundle and impregnates the opened fiber bundle with molten thermoplastic resin; and a nozzle provided in an outlet section of a container of the resin impregnation device and defining a slit allowing the fiber bundle impregnated with the thermoplastic resin to pass through the slit, the nozzle bringing the fiber bundle passing through the slit into a tape shape. The nozzle includes a dimension selection mechanism allowing a gap dimension of the slit defined by the nozzle to be selected between a normal dimension equivalent to a target thickness dimension of the fiber-reinforced thermoplastic resin tape and a production-start dimension larger than the normal dimension.

This apparatus, in which the production-start dimension larger than the normal dimension at the start of production can be selected as the gap dimension of the slit and the gap dimension can be changed into the normal dimension at a point in time when a predetermined condition is satisfied, after the production start, makes it possible to produce a satisfactory fiber-reinforced thermoplastic resin tape while preventing fiber cut from occurring at the start of production.

For example, the nozzle desirably includes a first nozzle member and a second nozzle member disposed to be opposed to each other across the slit, a pair of first shim plates having respective first thickness dimensions corresponding to the normal dimension and configured to be sandwiched between the first nozzle member and the second nozzle member at an interval widthwise of the slit between the first shim plates to thereby determine the gap dimension of the slit to a dimension corresponding to the first thickness dimension, and a pair of second shim plates having respective second thickness dimensions larger than the first thickness dimension and equivalent to the production-start dimension and configured to be sandwiched between the first nozzle member and the second nozzle member at an interval widthwise of the slit between the second sim plates to thereby determine the gap dimension of the slit to a dimension corresponding to the second thickness dimension. In this nozzle, sandwiching the second shim plates having respective second thickness dimensions between the first nozzle member and the second nozzle member at the start of production allows the gap dimension of the slit to be the production-start dimension to thereby prevent fiber cut, and replacing thereafter the second shim plates with the first shim plates having the first thickness dimension to change the gap dimension of the slit into the normal dimension allows a fiber-reinforced thermoplastic resin tape having the target thickness dimension to be produced.

The invention claimed is:

1. A process for producing a fiber-reinforced thermoplastic resin tape, the process comprising:
    a resin impregnation step of opening a fiber bundle and impregnating the opened fiber bundle with molten thermoplastic resin; and
    a through-nozzle passing step of passing the fiber bundle having undergone the resin impregnation step through a slit formed in a nozzle to form the resin bundle into a tape shape, the slit having a gap dimension that corresponds to a thickness dimension of the resin bundle formed into the tape shape through the slit, wherein
    the through-nozzle passing step includes passing the fiber bundle, at the start of production, through the slit in a state where the gap dimension of the slit is set to a production-start dimension that is larger than a normal dimension corresponding to a target thickness dimension of the fiber-reinforced thermoplastic resin tape and changing the gap dimension of the slit, at a point in time when a predetermined condition is satisfied after the start of production, into the normal dimension from the production-start dimension and then passing the fiber bundle through the slit.

2. A process for producing a fiber-reinforced thermoplastic resin tape, the process comprising:
    a resin impregnation step of opening a fiber bundle and impregnating the opened fiber bundle with molten thermoplastic resin; and
    a through-nozzle passing step of passing the fiber bundle having undergone the resin impregnation step through a slit formed in a nozzle to form the resin bundle into a tape shape, wherein
    the through-nozzle passing step includes passing the fiber bundle, at the start of production, through the slit in a state where the slit has a gap dimension larger than a normal dimension corresponding to a target thickness dimension of the fiber-reinforced thermoplastic resin tape and changing the gap dimension of the slit, at a point in time when a predetermined condition is satisfied after the start of production, into the normal dimension and then passing the fiber bundle through the slit, and
    the predetermined condition is that predetermined time elapses after the production start.

3. A process for producing a fiber-reinforced thermoplastic resin tape, the process comprising:
    a resin impregnation step of opening a fiber bundle and impregnating the opened fiber bundle with molten thermoplastic resin; and
    a through-nozzle passing step of passing the fiber bundle having undergone the resin impregnation step through a slit formed in a nozzle to form the resin bundle into a tape shape, wherein
    the through-nozzle passing step includes passing the fiber bundle, at the start of production, through the slit in a state where the slit has a gap dimension larger than a normal dimension corresponding to a target thickness dimension of the fiber-reinforced thermoplastic resin tape and changing the gap dimension of the slit, at a point in time when a predetermined condition is satisfied after the start of production, into the normal dimension and then passing the fiber bundle through the slit, and
    the predetermined condition is that the fiber bundle is opened enough to allow a width of the fiber bundle to reach a target width which is a width of the fiber-reinforced thermoplastic resin tape to be produced.

4. The process for producing a fiber-reinforced thermoplastic resin tape according to claim 2, wherein the through-nozzle passing step includes increasing production speed, which is speed at which the fiber bundle passes through the slit, with the elapse of time from the production start and wherein the predetermined condition is that the production speed reaches predetermined speed.

5. An apparatus for producing a fiber-reinforced thermoplastic resin tape, the apparatus comprising:
    a resin impregnation device that opens a fiber bundle and impregnates the opened fiber bundle with molten thermoplastic resin; and
    a nozzle provided in an outlet section of a container of the resin impregnation device and defining a slit allowing the fiber bundle impregnated with the thermoplastic resin to pass through the slit, the nozzle bringing the fiber bundle passing through the slit into a tape shape, the slit having a gap dimension that corresponds to a thickness dimension of the resin bundle formed into the tape shape through the slit, wherein
    the nozzle includes a dimension selection mechanism allowing a gap dimension of the slit defined by the nozzle to be selected between a normal dimension equivalent to a target thickness dimension of the fiber-reinforced thermoplastic resin tape and a production-start dimension larger than the normal dimension.

6. The apparatus for producing a fiber-reinforced thermoplastic resin tape according to claim 5, wherein the nozzle includes a first nozzle member and a second nozzle member disposed to be opposed to each other across the slit, a pair of first shim plates having respective first thickness dimensions corresponding to the normal dimension and configured to be sandwiched between the first nozzle member and the second nozzle member at an interval between the first sim plates widthwise of the slit to thereby determine the gap dimension of the slit to a dimension corresponding to the first thickness dimension, and a pair of second shim plates having respective second thickness dimensions larger than the first thickness dimension and equivalent to the production-start dimension and configured to be sandwiched between the first nozzle member and the second nozzle member at an interval between the second sim plates widthwise of the slit to thereby determine the gap dimension of the slit to a dimension corresponding to the second thickness dimension.

7. The process for producing a fiber-reinforced thermoplastic resin tape according to claim 3, wherein the through-nozzle passing step includes increasing production speed, which is a speed at which the fiber bundle passes through the slit, with the elapse of time from the production start and wherein the predetermined condition is that the production speed reaches a predetermined speed.

\* \* \* \* \*